UNITED STATES PATENT OFFICE.

WILBUR L. WRIGHT, OF FULTON, NEW YORK, ASSIGNOR TO SEALRIGHT CO., INC., OF FULTON, NEW YORK, A CORPORATION OF NEW YORK.

RENDERING PAPER AND PAPER CONTAINERS GREASEPROOF.

1,417,708.     Specification of Letters Patent.     Patented May 30, 1922.

No Drawing.     Application filed July 11, 1918. Serial No. 244,472.

*To all whom it may concern:*

Be it known that I, WILBUR L. WRIGHT, a citizen of the United States, and resident of Fulton, county of Oswego, State of New York, have invented certain new and useful Improvements in and Relating to Rendering Paper and Paper Containers Greaseproof, of which the following is a specification.

This invention relates to the art of rendering paper and paper containers grease proof, and the objects and nature of the invention will be readily understood by those skilled in the art in the light of the following explanation of what I now believe to be the preferred composition and methods of producing and using the same from among variations within the spirit and scope of the invention.

An object of the invention is to subject paper and paper containers to a simple economical treatment to prevent grease-like substances (fats, oils and the like) from permeating paper so treated by capillary action or otherwise, and without rendering such paper and containers unfit for packaging or coming in contact with food products, and without unduly increasing the cost of paper containers for grease like substances or of packaging such substances in grease proof containers, and without causing deterioration of the paper or containers so treated.

With these and other objects in view, my invention consists in the utilization of certain ingredients and their equivalents for application to paper and paper material in such a manner as to render such paper proof against the passage of oils and greases therethrough by capillary action or otherwise.

My present invention is based on the facts that various compounds included under the general term sugar, are harmless commercial products, more or less easy to secure, and are not appreciably soluble in oils and other greases, particularly food products of grease like nature or substance, and that hence paper will constitute a barrier against the passage of grease if by any possibility such paper can be provided with an unbroken or impervious coating of sugar or if the fibres and body of the paper can be completely filled or impregnated with sugar. Sugar is edible and hence paper so treated would not be objectionable for packaging food products of grease-like nature such as edible oils, lard, butter, and butter and lard substitutes.

However, certain serious problems are involved in the application of sugar to paper to form the said coating or to produce the said filling, among other reasons because of the crystalline formation of some sugar compounds and the more or less permanently sticky nature of other sugar compounds, and the approximate impossibility of forming an impervious or unbroken layer of sugar either within or on the surface of paper, or that will not be adversely subject to varying degrees of atmospheric humidity and temperature and other conditions or that will be capable of expanding, contracting and flexing without cracking or causing fissures.

I have discovered that the desirable qualities of sugar for paper grease-proofing purposes, can be utilized if a sufficient proportion of some edible or harmless substance is added to the sugar to prevent crystallization thereof and to carry the sugar in more or less uniform distribution over the surface or into the body of the paper to form a flexible, more or less elastic, unbroken or impervious barrier without objectionable sticky nature or color.

I have found that various gelatines and their equivalents, are well suited for this purpose. I use the term gelatine in its broad sense to include gums and glue, but where the paper is to be used for packaging or coming in contact with food products, I employ a pure edible gelatine or gum such as any suitable gelatine found on the market.

The dissolved or liquefied gelatine is mixed with a large proportion of sugar, say approximately to the point of saturation so that the final grease proofing composition will carry approximately the largest possible quantity of sugar uniformly distributed throughout or included in the same. The sugar ingredient can consist of cane or beet sugar or glucose or a combination of glucose and cane or beet sugar.

I also prefer to include in the composition, a hygroscopic ingredient to maintain the desired flexibility of the dried composition in or on the paper to which it has been applied. I find that a small proportion of a suitable glycerine is well adapted for this purpose, preferably a pure edible glycerine. However, when glucose is employed as the sugar ingredient, or when some gum that does not become plastic or semi-solid when cool is employed as the gelatine ingredient, the hygroscopic ingredient may not be necessary, as the glucose or the peculiar gelatine may perform the functions thereof in maintaining the desired flexibility of the composition after application and drying.

I also find it desirable to include in the composition compound a very small proportion or quantity of alum, cream of tartar or other equivalent hardening substance, where the paper to be grease proofed is to be subjected to high temperature in hot countries and during storage or shipment. Although I do not wish to so limit all features of my invention, a small quantity of alum or cream of tartar is usually added as it does no harm even where the paper to be treated will not thereafter be subjected to high temperatures.

I find that very satisfactory results are attained where gelatine and sugar are dissolved in water and mixed in the presence of heat about in the proportion of four ounces of sugar, one ounce of gelatine, and sixteen ounces of water, and where cane sugar is used, say about one dram of glycerine, and about ten grains of alum or cream of tartar.

In compounding these ingredients, I soften the gelatine by soaking the same for the necessary length of time in the proportion of warm water. When the gelatine is soft, the vessel containing the same and the water, is heated over a slow fire and the sugar is added, also the glycerine and alum or cream of tartar if to be used. The composition is agitated and the ingredients are thoroughly dissolved and mixed while the temperature of the composition is more or less slowly brought up to about 200° F., whereupon the compound is ready for use.

The composition is applied while in a thin or fluid liquid state and while hot or warm, although it should not be heated to the boiling point, but the liquid composition can be applied while cool when the sugar ingredient is in the form of glucose or when the gelatine is of the kind that does not become plastic or solid when cool.

This liquid composition can be applied as a bath by submerging the paper therein or by drawing the paper therethrough and by reason of its thin very fluid condition the liquid is peculiarly adapted for application to the paper by spraying under pressure or otherwise by suitable apparatus so as to thoroughly subject all portions of the paper surfaces to the liquid. Also, the liquid can be applied to paper during the process of manufacture. For instance, a suitable proportion of the liquid might be added to the pulp in the beater, or the liquid might be applied to the sheet paper as a coating after the paper has reached the calender rolls in the paper machine.

The liquid composition when applied to the surface of paper dries quickly producing a bright smooth surface that is approximately hard or non-sticky yet flexible and more or less elastic, is approximately tasteless, odorless, approximately colorless, does not roughen up or change the texture or cause deterioration of the paper, and does not set up or cause harmful chemical action in food products.

Paper cans, containers or other paper vessels can be rendered grease proof by dipping or immersion in the liquid composition to not only render the smooth surfaces of the paper grease proof but so that the liquid will enter all cracks, corners, joints and seams of the containers with possibly surplus quantities of the composition which will dry and fill and close the same against passage of grease by the interposition of the sugar composition.

I generally prefer, however, to thoroughly apply the thin liquid composition, while hot or warm, to the interior surfaces, corners, and seams of the paper containers by spraying. The liquid being thin or very fluid is quickly and easily applied by spraying, and the comparatively quick drying quality is of great advantage in the production of paper containers as the process of manufacture and packing or shipment is not thereby delayed.

I have discovered that superior grease proofing results are attained, particularly where grease proofing the interiors of paper containers, if the inner surface of the container is composed of paper that was not subjected to the usual resin-alum or like sizing during the process of manufacture. I find that my grease proofing composition seems to more thoroughly and extensively enter into and impregnate such non-sized paper and close the same against passage of grease, than is the case where sized paper is treated as the sizing in a measure resists the entrance of the liquid composition into the body and fibre of the paper. However, be that as it may, my composition is successfully employed in grease proofing the ordinary paper material used for packaging and for making paper containers and I do not wish to limit my invention to grease proofing paper that has not been sized.

I find that when my composition is properly applied in a liquid state to the interior walls and surfaces of paper containers that it enters into and impregnates all exposed surface portions of the paper body and when dried covers or fills and closes the same with a gelatine-like substance in which the sugar compound is present in such quantity and so uniformly distributed as to absolutely bar the passage of grease-like substances such as fats and oils, and also forms a filler of the dried gelatine-like sugar compound that likewise closes and fills all defects, corners, seams, joints and cracks in the interior of the container against passage or seepage of grease. This gelatine-like sugar composition thus entering into and coating the paper surfaces is tough and flexible so that the paper can be bent without cracking the coating and is also elastic permitting expansion and contraction of the paper and its fibres without destroying the grease proofing qualities of the coating, and furthermore the characteristics of this sugar compound coating are such that it does not peel or separate from the paper surface.

The gelatine, or equivalent substance, serves as a carrier, binder or fixative for the large proportion of dissolved sugar and prevents crystallization and holds the sugar uniformly distributed and carries the same into the fibres and texture of the paper to form a grease barrier.

What I claim is:—

1. A grease proofing composition for paper and the like, consisting of a solution of sugar, a binder and fixative, a hygroscopic ingredient, and a hardening ingredient, substantially as described.

2. A grease-proofing composition containing sugar approximately to the point of saturation and a binder.

3. A greaseproofing composition comprising a gelatine-like solution containing sugar approximately to the point of saturation.

4. A greaseproofing composition containing sugar approximately to the point of saturation, a binder and a hygroscopic agent.

5. A greaseproofing composition containing sugar approximately to the point of saturation, a binder and a hardening agent.

6. Paper material embodying a grease barrier formed by the application thereto of a sugar solution comprising sugar in preponderating percentage, a binder, a hygroscopic ingredient, and a hardening ingredient.

7. Paper material having a coating produced by the application thereto of a composition comprising an adhesive soluble in water and sugar approximately to the point of saturation.

8. A grease proofing composition comprising a binder, sugar, glycerine, and alum or its equivalent.

9. A grease proofing composition consisting of gelatine, sugar, glycerine, and alum or its equivalent.

10. A grease proofing composition comprising sugar and a binder, in about the proportions of approximately four ounces of sugar to one of binder.

11. A paper container having an inner coating produced by the application thereto of a composition the base of which is sugar, and comprising sugar approximately to the point of saturation and a hygroscopic ingredient.

12. A paper container having an inner dry flexible non-sticky coating to serve as a grease barrier and produced by the application thereto of a quick-drying sugar solution embodying a binder and a preponderating percentage of sugar.

13. A paper container having an inner dry flexible non-sticky coating to serve as a grease barrier and produced by the application thereto of a quick-drying sugar solution embodying a binder, a hygroscopic ingredient, a hardening ingredient, and sugar in preponderating percentage.

14. Paper embodying a grease barrier formed by the application of a sugar solution comprising sugar in preponderating percentage and a binder.

15. A paper container having an inner dry flexible coating comprising an edible sugar, a hardening ingredient, an edible binder, and an edible hygroscopic ingredient.

16. Paper material embodying a grease barrier formed by the application thereto of a solution comprising a binder, a hygroscopic ingredient, a hardening ingredient, and cane sugar.

17. Paper material embodying a grease barrier formed by the application of a solution of sugar and a binder, the proportion of sugar exceeding the proportion of binder.

WILBUR L. WRIGHT.